United States Patent [19]

Mori

[11] Patent Number: 4,761,716

[45] Date of Patent: Aug. 2, 1988

[54] LIGHTING SYSTEM FOR BUILDING

[76] Inventor: Kei Mori, 3-16-3-501, Kaminoge, Setagaya-ku, Tokyo, Japan

[21] Appl. No.: 37,083

[22] Filed: Apr. 10, 1987

Related U.S. Application Data

[63] Continuation of Ser. No. 463,089, Feb. 2, 1983, abandoned.

[30] Foreign Application Priority Data

Feb. 9, 1982 [JP] Japan .................................. 57-19397

[51] Int. Cl.⁴ ................................................ G02B 17/00

[52] U.S. Cl. ........................................ 362/32; 362/147; 362/805; 52/28; 350/258

[58] Field of Search ...................... 362/1, 32, 145, 147, 362/101, 805; 52/28, 169.6; 350/258

[56] References Cited

U.S. PATENT DOCUMENTS

| | | | |
|---|---|---|---|
| 4,152,752 | 5/1979 | Niemi | 362/145 |
| 4,198,953 | 4/1980 | Power | 350/258 |
| 4,297,000 | 10/1981 | Fries | 362/32 |
| 4,352,260 | 10/1982 | Pearcey et al. | 52/169.6 |
| 4,389,085 | 6/1983 | Mori | 350/258 |
| 4,394,860 | 7/1983 | Smith | 350/258 |

FOREIGN PATENT DOCUMENTS

| | | | |
|---|---|---|---|
| 0024305 | 3/1981 | Japan | 350/258 |

*Primary Examiner*—Charles J. Myhre
*Assistant Examiner*—David A. Okonsky
*Attorney, Agent, or Firm*—Jordan and Hamburg

[57] ABSTRACT

Lighting by the sunlight is available in every space in a building, even those spaces which have been hardly utilized such as the basement and ground water pit. The sunlight is collected and guided by optical cables to light radiators which are located in intended spaces of a building. The basement has a cistern for water therein to afford a shelter in the case of emergency, while the ground water pit which is also lighted by the conducted sunshine is usable to cultivate fish, plants, and other foodstuffs. The building is annular except for its first floor so that a cylindrical open space is defined thereinside and also lighted by the sunlight, thereby introducing the sunlight even into the radially innermost spaces of the sunlight.

6 Claims, 3 Drawing Sheets

LIGHTING SYSTEM FOR BUILDING

This application is a continuation, of application Ser. No. 463,089 filed Feb. 2, 1983, and now abandoned.

BACKGROUND OF THE INVENTION

The present invention relates to a lighting system for a building which utilizes the sunshine to promote effective use of every available space of the building inclusive of an underground structure thereof.

A majority of buildings today have generally quadrilateral or like cross-sections. Where such a building is of a substantial scale, rooms at its central part are unavoidably isolated from the outside and, therefore, have to be furnished with installations for artificial lighting and ventilation. This kind of buildings may be suitable for providing for offices but not for housing at all.

In designing a building for living quarters, it is desirable that at least one opening of each apartment directly faces the outside of the building to permit the occupants to enjoy the sunshine in the daytime. It is also desirable that the outside air can be introduced into the apartment through a window or the like to flow therethrough whenever desired. To meet these requirements, buildings for living quarters are generally formed flat so that their depth may be small and the apartments may be arranged side by side to individually have direct access to the outside. However, such an upright thin structure is quite susceptive to widthwise vibration and, therefore, cannot be designed higher than a certain limit.

Recently, plans have been presented for the construction of cylindrical buildings and annular or substantially annular buildings for housing applications, which will achieve a taller and more vibration resistive structure. However, despite the potentially tall and small plottage structure, this type of building will still leave its central space in the shade all day long if its diameter is relatively small.

Apart from the drawbacks discussed above, the usefulness of various subordinate spaces of buildings has heretofore been neglected. For example, while a building is usually provided in its underground structure a pit for collecting ground water, the pit or the ground water has not been utilized at all. This limits the utilization of the whole building and wastes the potential utility of the subordinate spaces associated with the building.

SUMMARY OF THE INVENTION

A lighting system of the present invention comprises, in combination, a building having a substantially annular cross-section except for the first floor thereof, a sunlight collector positioned on the top of the building for collecting the sunlight, a light conductor for conducting the sunlight collected by the sunlight collector, and a light radiator for radiating the sunlight conducted by the light conductor, the light radiator being disposed in a cylindrical open space defined by the annulus of the building.

In accordance with the present invention, lighting by the sunlight is available in every space in a building, even those spaces which have been hardly utilized such as the basement and ground water pit. The sunlight is collected and guided by optical cables to light radiators which are located in intended spaces of a building. The basement has a cistern for water therein to afford a shelter in the case of emergency, while the ground water pit which is also lighted by the conducted sunshine is usable to cultivate fish, plants, and other foodstuffs. The building is substantially annular except for its first floor so that a cylindrical open space is defined thereinside and also lighted by the sunlight, thereby introducing the sunshine even into the radially innermost spaces of the building.

It is an object of the present invention to provide a lighting system which enhances the utility of the annular or substantially annular building as a whole.

It is another object of the present invention to provide a lighting system which promotes effective use of heretofore neglected subordinate spaces of a building, thereby totally increasing the usefulness of the building.

It is another object of the present invention to provide a generally improved lighting system for building.

Other objects, together with the foregoing, are attained in the embodiment described in the following description and illustrated in the accompanying drawings.

DESCRIPTION OF THE PREFERRED EMBODIMENT

While the lighting system for a building of the present invention is susceptible of numerous physical embodiments, depending upon the environment and requirements of use, a substantial number of the herein shown and described embodiment have been made, tested and used, and all have performed in an eminently satisfactory manner.

Figure 1:
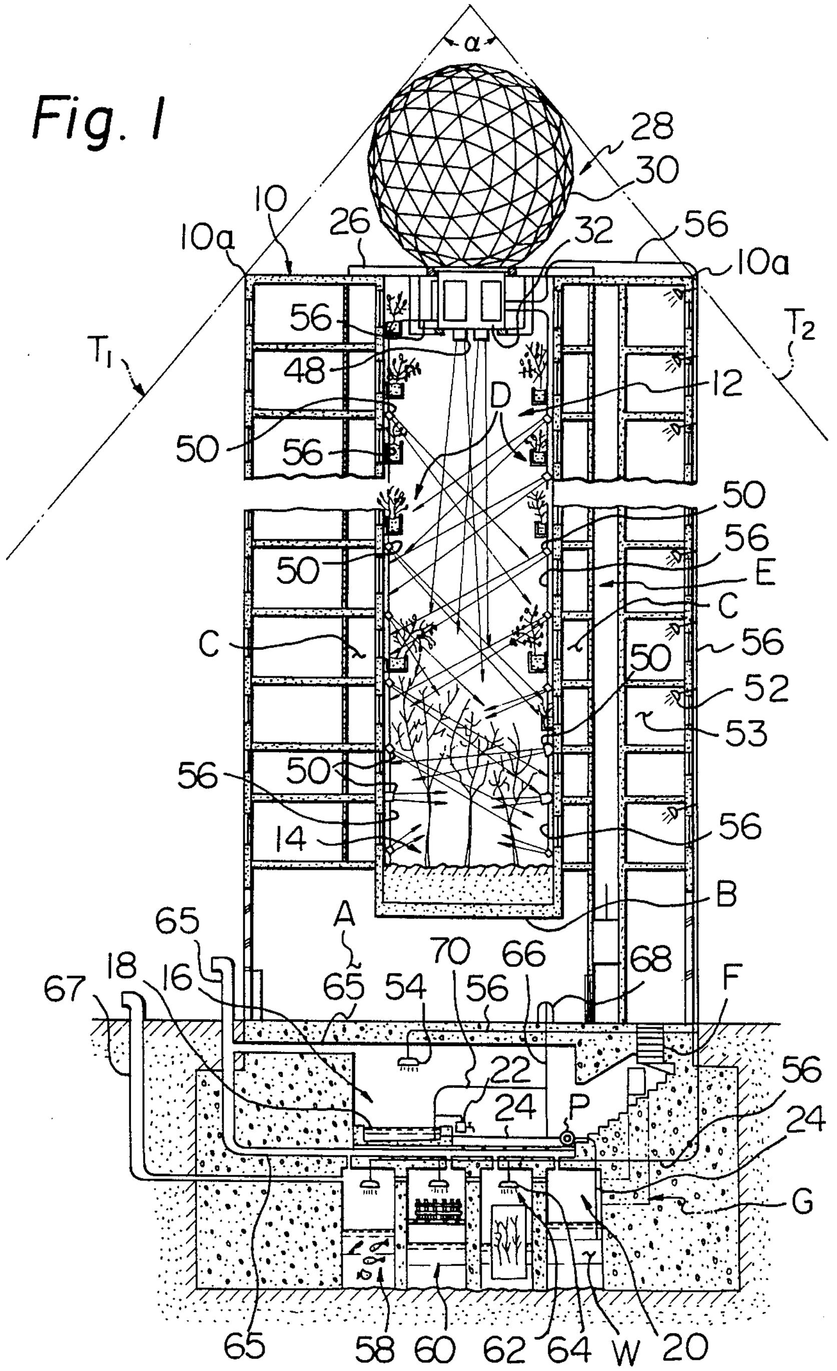
FIG. 1 is a sectional elevation of a building furnished with a lighting system of the present invention.

Referring to FIG. 1 of the drawings, a building to which the present invention is applicable is shown and generally designated by the reference numeral 10. The building 10 has a first floor A which offers a space for public use such as for stores and shops, which is accessible from any desired side of the building. The rest of the building 10 above the first floor A has an annular cross-section which defines an upwardly extending open space 12 thereinside. Located at the bottom of the space 12 is an artificial ground B which forms a courtyard 14 with trees planted therein, for example. The annular upper section of the building 10 has hallways C which extend along the inner edge of the annulus. An elevator shaft E extends throughout a north section of the building 10 to be accessible from the hallways C. Flower balconies D protrude from the building 10 into the open space 12 along the hallways C. Further, a basement 16 is formed below the first floor A which may serve as a gymnasium or a shelter as the case may be. The basement 16 has thereinside a cistern 18 which may be used as a pool or a drinking water tank when the basement 16 is used as a gymnasium or a shelter, respectively. The cistern 18 may even supply water for fire fighting. A pump P is installed in the basement 16 to supply ground water W to the cistern 18 from an underground pit 20. A sterilizing and filtering device 22 is adapted to clean the ground water which will collect itself in the cistern 18. The water W is pumped to the cistern 18 through a piping 24 which extends from the ground water pit 20.

Figure 2A:
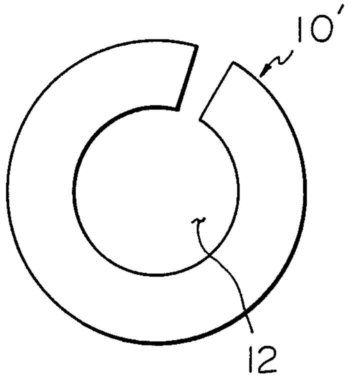
FIGS. 2A and 2B are schematic sections representing other contours of buildings to which the present invention is applicable.
Figure 2B:
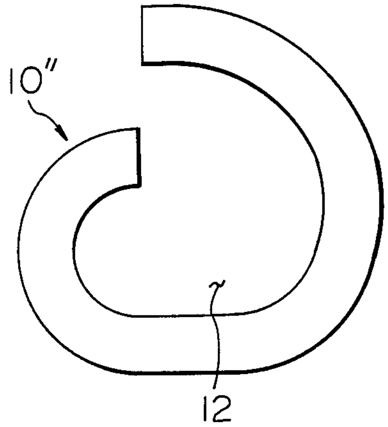

While the building 10 has been shown and described as having a complete annular cross-section, it is not limitative but may be replaced by a substantially annular cross-section as indicated by 10′ in FIG. 2A or by 10″ in FIG. 2B.

Figure 3:
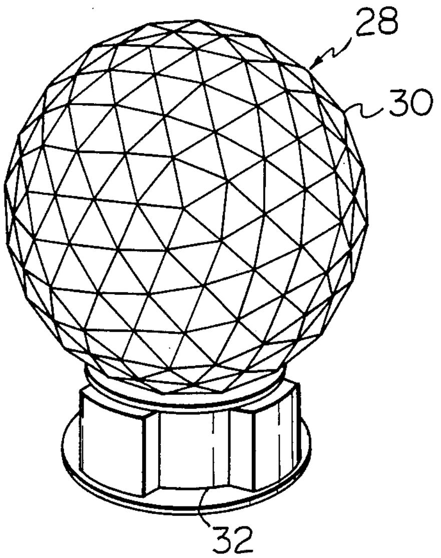
FIG. 3 is a perspective view of a sunlight collector which forms part of the construction shown in FIG. 1.

A frame or support 26 is fixed to the top of the building 10 spanning the open top of the space 12. The frame 26 supports a generally spherical sunlight collector which is generally designated by the reference numeral 28. As shown in FIG. 3, the sunlight collector 28 comprises a generally spherical transparent dome 30 and a generally cylindrical base 32 which supports the dome 30 thereon. Accommodated in the dome 30 of the sunlight collector 28 is an assembly for chasing and collecting the sunlight.

Figure 4:
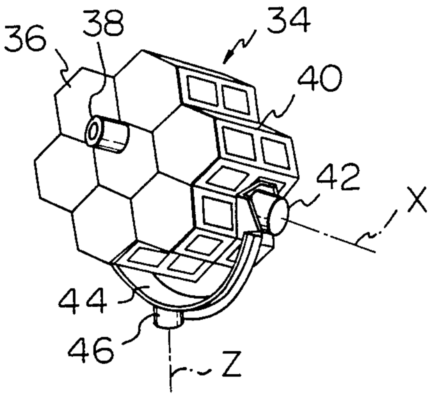
FIG. 4 is a perspective view of an assembly disposed in a dome of the sunlight collector.

As shown in FIG. 4, the sunlight chasing and collecting assembly, designated by the reference numeral 34, comprises a number of lenses 36 and a single photodetector 38 sensitive to the sunlight. The lenses 36 and sensor 38 are bundled up together by a first frame member 40 which is driven for rotation by a first motor or like drive means 42 about a horizontal axis X. The frame 40 is supported by a generally C-shaped second frame member 44 to be rotatable about the axis X. The C-shaped frame 44 is fixedly mounted on a vertical shaft 46 to be rotatable therewith about a vertical axis Z, which is perpendicular to the axis X. The shaft 46 is operatively connected to a second motor or like drive means (not shown). A control unit (not shown) controls the operation of the first and second motors in response to an output signal of the photodetector or sunlight sensor 38.

The sunlight collected by the collector 28 is utilized to illuminate various sections of the building 10. Light radiators 48 are mounted in the bottom of the base 32 of the collector 28 so as to direct the collected sunlight toward the courtyard 14. A number of light radiators 50 are located on the inner peripheral wall of the building 10 so that the light emitted from each of the light radiators 50 will be directed across the space 12 to illuminate its facing wall as well as the flower balcony D. Light radiators 52 are installed in the rooms of the building 10 which the sunlight cannot reach, e.g. rooms 53 in the northern part of the building 10. Further, a light radiator 54 is disposed in the basement 16. Each of these light radiators 50–54 is optically connected to the sunlight collector 28 by an optical cable 56 so as to be supplied with the collected sunlight.

In accordance with the present invention, the pit 20 adapted to collect the ground water W may be constructed to culture or cultivate various forms of life therein. In the illustrated embodiment, the pit 20 is subdivided into a fish breeding section 58, a mushroom culturing section 60 and an alga or plant culturing section 62, by way of example. Again, each of these sections 58–62 is illuminated by a light radiator 64 which is optically connected to the sunlight collector 28 by an optical cable 56. The resultant multiplication in the sections 58–62 will proceed as effectively as on the ground due to the supply of the sunlight. For the supply of air, air induction pipes 65 and 67 communicate the basement 16 and the various culture sections 58–62 to the outside of the building 10, respectively.

A staircase F leads from the first floor A of the building 10 to the basement 16 while a staircase G extends from the basement 16 to the culture sections 58–62. Where the basement 16 is used as a shelter in the case of emergency, the staircase G permits one to make access to the culture sections 58–62 in order to collect desired foodstuffs cultivated therein.

Furthermore, a conduit 66 extends from the piping 24 downstream of the pump P to terminate at a fire hydrant 68, which is located on the first floor A of the building 10. Firefighting water is also supplied from the cistern 18 in the basement 16 by a conduit 70 which also terminates at the fire hydrant 68.

The outside diameter of the dome 30, relative to the height and outside diameter of the building 10, has to abide by regulations, if any. For example, the angle $\alpha$ between the lines $T_1$ and $T_2$ extending from the shoulders 10*a* tangentially to the dome 30 as shown in FIG. 1 must be made smaller than a predetermined angle in accordance with a horizontal distance between the building 10 and a neighboring road. This angle $\alpha$ is related with the ratio in outside diameter of the dome 30 to the building 10 as well as the overall height of the building 10. Hence, the dimensions of the dome 30 should also be determined in due consideration of the distance between the building and the adjacent road, height and diameter of the building and angle $\alpha$ between the lines $T_1$ and $T_2$.

In summary, it will be seen that the present invention provides a lighting system which realizes quite a useful and comfortable building in which all the desired spaces are full of sunshine as long as it is available. Even the basement or the ground water pit serves a specific function as described with the aid of the sunshine conducted thereto.

Various modifications will become possible for those skilled in the art after receiving the teachings of the present disclosure without departing from the scope thereof. While the building to which the present invention is applicable has been shown and described as providing for apartments for living quarters, it may naturally provide for offices in an urban district.

What is claimed is:

1. In an arrangement, the combination of a building having a substantially annular cross-section except for the first floor thereof, said building above the first floor having an inner wall means defining an outer boundary of a cylindrical open courtyard space, said building having artificial ground means disposed over said first floor and disposed within said courtyard space to define the bottom of said courtyard space, frame support means disposed on said building to directly overlie said courtyard space, sunlight collector means mounted on said frame support means in a position directly overlying said courtyard space, light conductor means for conducting the sunlight collecting means, a plurality of light radiator means receiving the conducted sunlight from said light conducting means and radiating the sunlight outwardly from the light radiator means, said sunlight collector means having a base, a first plurality of said light radiator means mounted on said base of said sunlight collector means and disposed in a position directly overlying said courtyard space such that said first light radiator means radiate light downwardly into the courtyard space to said underlying artificial ground means, whereby said first plurality of light radiator means light up the courtyard space and provide light for the artificial ground means, a second plurality of light radiator means disposed on said inner wall means for directing light across the courtyard space to illuminate said inner wall means, a basement on which said building is disposed, growth means in said basement providing for growth of a form of life, a third plurality of said light radiator means disposed in said basement to provide light to said growth means, whereby said courtyard space, said inner wall means of said courtyard space, and said growth means in said basement are lighted by the sunlight collected by said sunlight collector means.

2. In an arrangement as claimed in claim 1, wherein said building has a generally C-shaped cross-section.

3. In an arrangement as claimed in claim 1, wherein said building also has an outer wall means and two end walls, one of said end walls connecting one end of said inner wall means and one end of said outer wall means, the other of said end walls connecting the other end of said inner wall means and ther other end of said outer wall means.

4. In an arrangement as claimed in claim 3, wherein said building has a circular configuration with the center of the circle coinciding with the center of said courtyard space, said first and second end walls being spaced from one another and each being disposed along a radius line of said circle.

5. In an arrangement as claimed in claim 3, wherein said end walls are linearly aligned.

6. In an arrangement as claimed in claim 1, wherein said sunlight collector means has a generally spherical configuration.

* * * * *